Dec. 27, 1938.　　　　　F. R. MOTT　　　　　2,141,614
OVEN VALVE AND THE LIKE
Filed July 6, 1935　　　　2 Sheets-Sheet 1

Witnesses:
Elmer W. Hacker
Walter Chinn

Inventor
Frederick R. Mott
by B. Steed Jackson and Son
Attorneys.

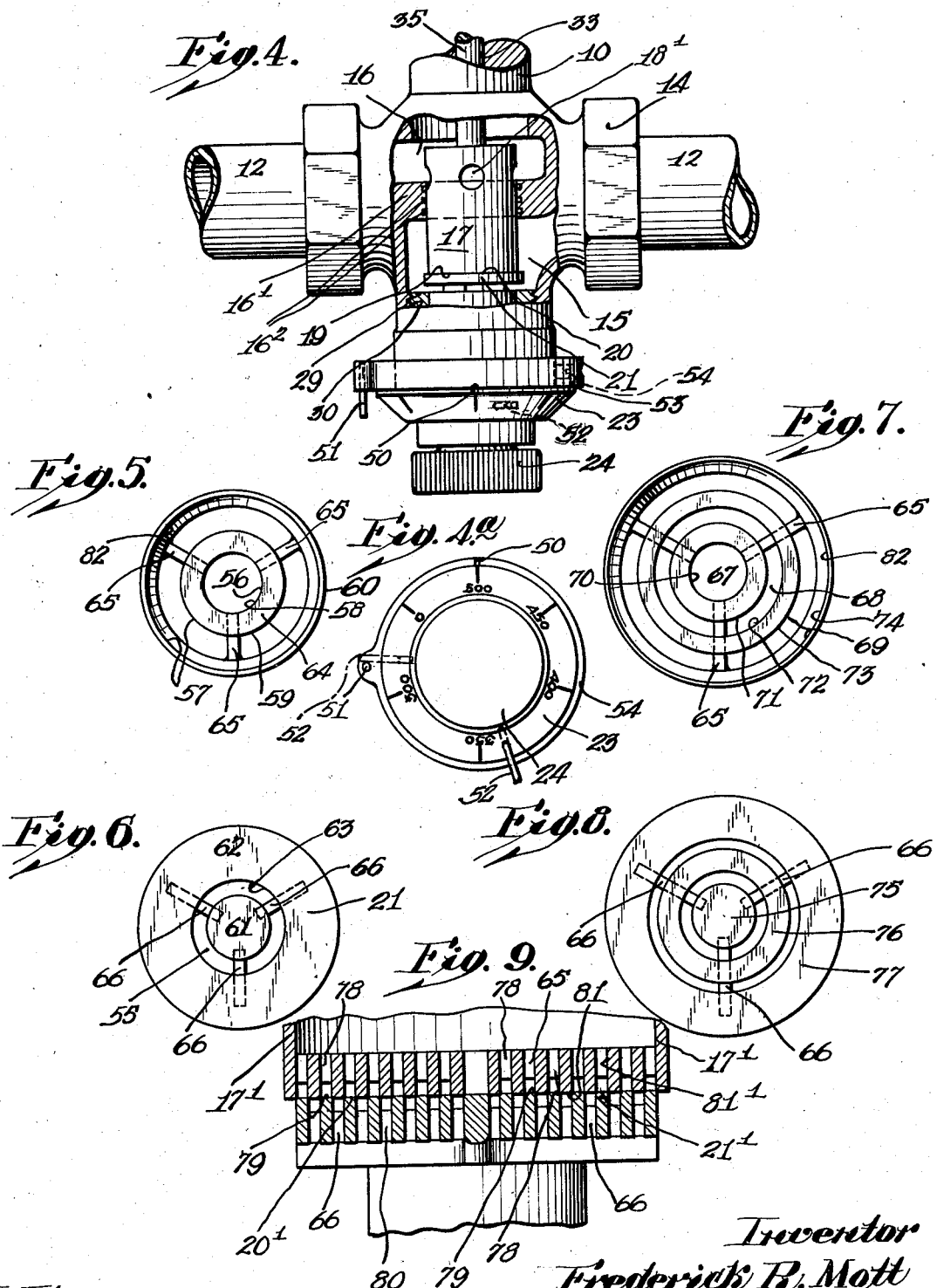

Patented Dec. 27, 1938

2,141,614

UNITED STATES PATENT OFFICE 2,141,614

OVEN VALVE AND THE LIKE

Frederick R. Mott, Philadelphia, Pa., assignor to Yarnall-Waring Company, Philadelphia, Pa., a corporation of Pennsylvania Application July 6, 1935, Serial No. 30,082

8 Claims. (Cl. 137—139)

My present invention relates to thermostatic valves, particularly such as are adapted to control the flow of fuel or of any heating medium to a heater to maintain substantial uniformity in a temperature responsive to that flow.

The present invention is a development of the subject matter of my copending United States Patent No. 2,008,400, granted July 16, 1935, for Thermostatic valves.

A purpose of my invention is to provide a device of the character indicated adapted to easy and inexpensive manufacture and well suited to the needs of service.

A further purpose is to increase the ratio of the port area to the temperature gradient, $$\frac{\Delta a}{\Delta t}$$

of a device of the character indicated by the use of multiple ports. I secure closer temperature regulation of the device by making the rate of change of effective port area incident to and with respect to variation of temperature at the thermostat larger by the use of multiple ports.

A further purpose is to adjustably limit the setting range of a thermostat to insure that the normal and perhaps unskilled operator of a heater controlled by the thermostat will not set the thermostat outside the desired range.

A further purpose is to provide a temperature setting dial for use by the normal operator of a heater controlled by the thermostat with an adjustment out of reach of the operator to limit the maximum setting of the dial and thereby the maximum heater temperature.

A further purpose is to provide a novel arrangement of parts for an easy initial relative adjustment of a thermostatic element for cooperation, with a valve positioned by the element and a setting dial positioning the seat of the valve, adapting the thermostat to control fuel or the like passing through the valve according to selectively variant temperature settings of the dial.

A further purpose is to make a screw thread connection between a temperature setting dial member and the seat of a thermostatically positioned valve, so relating the pitch of the thread, the angularly spaced markings of the dial and the valve that a given change in temperature setting of the dial member will shift the valve seat to the same extent that the corresponding change in actual temperature at the thermostat will shift the valve, i. e., expressing it algebraically, such that $\Delta l_s/\Delta t_d = \Delta l_v/\Delta t_t$ where $\Delta l$ and $\Delta t$ are corresponding increments of position and temperature and the subscripts $s$, $d$, $v$ and $t$ relate the respective quantities to the seat, dial, valve and thermostat.

Further purposes will appear in the specification and in the claims.

My invention relates to the methods involved and to the apparatus employed.

I have elected to show one main form only of my invention, showing it however in a few minor variations that are practical and efficient in operation and which well illustrate the principles involved.

Figure 4 is a fragmentary elevation in part section corresponding generally to Figure 2, but with the valve element in a different position, shown open in Figure 2 and closed in Figure 4. Figure 4 also illustrates a modification of the dial structure.

Figure 4a is an end view of a modified dial of Figure 4.

Figure 2:
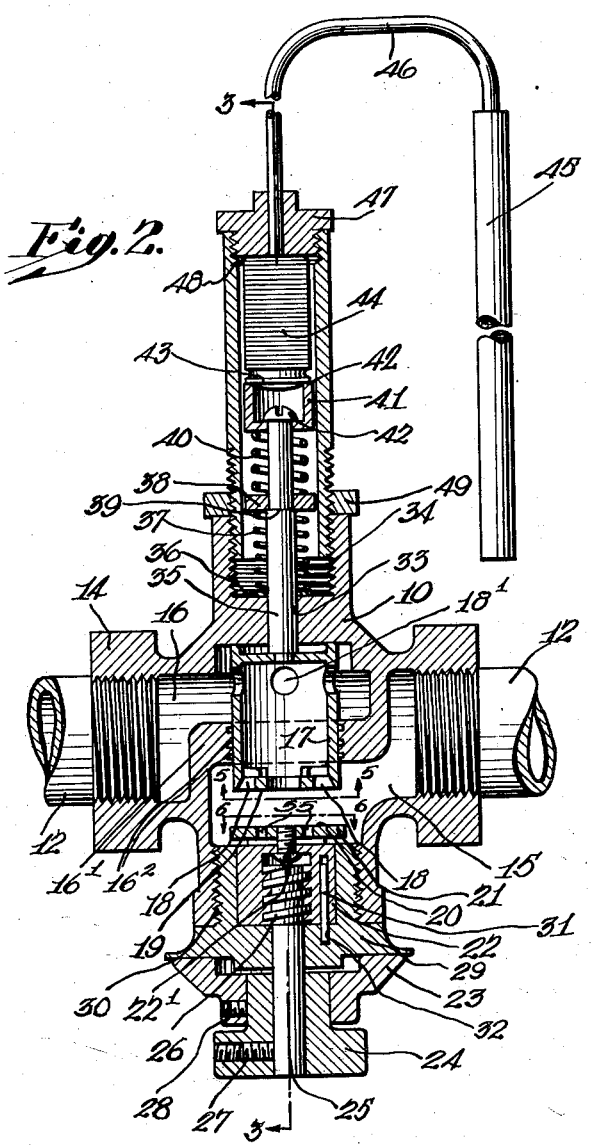
Figure 2 is a longitudinal section of structure embodying one form of my invention.
Figure 3:
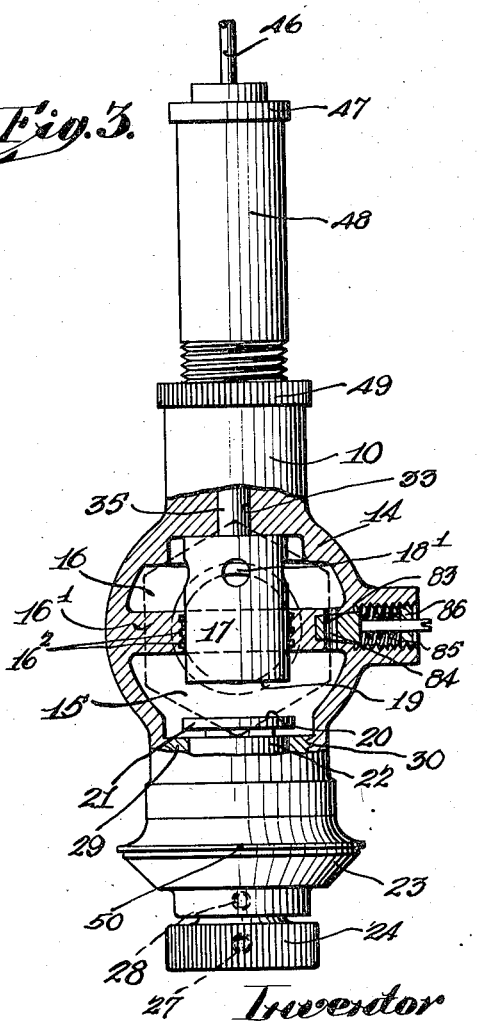
Figure 3 is a side elevation, in part section, of the structure of Figure 2.

Figures 5 and 6 are enlarged scale bottom and top plans respectively of valve and seat members of Figures 2 and 3, for example, sections upon the lines 5—5 and 6—6 respectively of Figure 2.

Figures 7 and 8 are views corresponding generally to Figures 5 and 6 but in a different form.

Figure 9 is a fragmentary diagrammatic section to illustrate that I may use any number of multiple ports and to illustrate the advantage from increasing the number of ports.

Like numerals refer to like parts in all figures.

My invention, while intended mainly for bread baking ovens, drying ovens, etc., which are fired by gas or other fluid fuel is also useful in the control of glue pots, paraffine baths, fudge warmers, deep fat fryers, steam tables, temperature baths, retorts, reaction vessels, coffee urns, chocolate urns, water urns, etc.

The present invention is designed particularly to bring the control of relatively large heaters such as commercial ovens within the permissible range of standard commercial thermostat units. As noted more in detail below, slight change in the temperature of the heater, as, for example, from the set temperature to a few degrees above or below the set temperature, must be effective to turn the valve on or off. As the motion of the thermostat is normally small, of the order of a few thousandths of an inch, the thermostat must open or close the valve with a few thousandths of an inch motion—otherwise, there will be excessive overheating at the upper end of the range and excessive lag in turning on the heat at the lower end of the range. In normal control, the temperature of the heater continues to rise after the heat is turned off and the temperature of the heater continues to drop after the heat is turned on, because there is a lag in the heat transfer between the heater and the heating means or the cooling effect. Therefore, if a thermostat is to control within a given range, it must actually shut off the burner or other heating means before the maximum temperature is reached and must turn on the burner before the minimum temperature is reached. Consequently, the range of travel of the valve is actually somewhat less than the travel would be if the thermostat actually reached the maximum temperature or the minimum temperature before the heating means was turned off or on, as the case might be.

I desire to give a very marked valve opening with even thousandths of an inch of valve separation from the seat so that the valve opening will be at any time substantially greater than the periphery of the valve multiplied by the distance of separation from the seat. This I accomplish by using a plurality of ports in the valve or valve seat, with a cooperating port or ports in the valve seat or valve.

I also desire to make the device more fool-proof by permitting a skilled installer to set limits upon the adjustment available to an unskilled operator of the device.

Describing in illustration and not in limitation and referring to the drawings.

Figure 1:
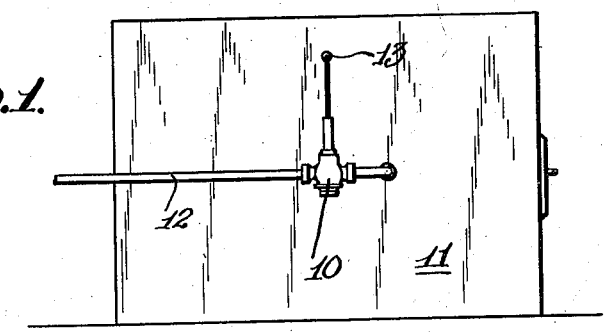
Figure 1 is a diagrammatic elevation showing structure suitably embodying my device as applied to an oven to maintain the temperature thereof at any desired set temperature.

In Figure 1 I illustrate my improved thermostatic valve 10 applied to a heater 11, here intended for a conventional indication of any heater (suitably a baking oven) to which my device is adapted to be applied. The valve is inserted in the fuel line 12 of the heater, the thermostatic element within the heater at 13 controlling the fuel flow through the valve to the heater burner, not shown. In case the installation is small, the valve may be more conveniently placed in a vertical rather than a horizontal stretch of fuel pipe so that the adjusting dial (to be described) will face the front of the heater.

The valve body 14, of cross type, has from opposite open ends longitudinally overlapping compartments 15 and 16, either of which may be inlet with the other outlet, and that communicate one with the other through the thermostatically movable hollow piston valve 17 and multiple ports 18 at the substantially flat face 19 of the piston registering longitudinally with substantially flat seat portions 20 of a seat 21 on a preferably adjustable seat carrier 22. The piston valve 17 has lateral ports 18' on the opposite side of the valve partition from the ports 18. The valve partition 16' has grooves 16² to prevent leakage of fluid around the piston valve.

The seat 21 pivots with respect to the seat carrier 22 on a screw 22'. The pivot is loose enough to make the seat self-levelling with respect to the flat valve face 19, but not to allow the seat axial movement independent of the seat carrier 22.

The seat carrier 22, when movable, may be adjustable in a direction axial of the valve. This adjustment is effected by suitable angular adjustment of a setting unit made up of a dial 23, head 24 and stem 25 which normally form a rigid unit. The stem 25 threads at 26 with the seat carrier and is preferably removably and adjustably connected at 27 with the head, in turn removably and adjustably connected at 28 with the dial 23.

The setting unit and seat carrier are both mounted in a screw plug 29 threading at 30 into the valve 14 and forming an end of the compartment 15. The seat carrier 22 is prevented from turning about its own axis by a pin 31 that loosely fits a bore 32 of the carrier.

Coaxial with the valve 17, the body is bored at 33 and counterbored and threaded at 34. The stem 35 of the valve fits the bore 33 and outwardly thereof is surrounded by washer 36, spring 37, washer 38 engaging shoulder 39, spring 40 and outwardly directed loosely fitting cup 41, with a retaining screw 42 limiting the outward movement of the cup 41.

The spring 40 is stronger than the spring 37, and, during normal operation, the spring 40 simply remains pre-compressed by the screw 42, and holds the washer 38 against the stem shoulder 39. The spring 37, compressed between the washer 36 and the washer 38, presses the valve continuously outwardly to retain continuous resilient engagement at the outer rim of the cup at 42 with the head end 43 of a thermostat bellows 44. In case the valve is seated, over-travel of the bellows merely further compresses the spring 40.

The thermostat unit of known commercial type includes an element 45, flexible connection 46, bellows 44 and screw fitting 47 rotatably surrounding the flexible connection.

In this construction the element 45 is suitably a metal tube or bulb sealed at the outer end and connected through capillary tubing 46 to the bellows, the element 45, tubing 46 and bellows 44 all containing a liquid of specific volume suitably variant with variation of temperature.

A suitable filler, not shown, restricts the free volume in the bellows to prevent changes in temperature at the valve from introducing an error in the operation. The filling of the thermostat bulb, bellows and flexible connection may desirably be an organic chemical liquid, which for one temperature range may be acetone.

The screw fitting 47 threads into the open end of a sleeve 48, which sleeve surrounds the bellows and extending portion of the valve stem, the sleeve 48 adjustably threading at 34 into the valve body and being retained in any set position by a lock nut 49. The adjustment of the sleeve 48 permits variation in the longitudinal position of the valve for any temperature of the thermostat element 45.

In practice the longitudinal movements of the valve incident to temperature changes at the thermostat are quite small. For example, a temperature change of 300° F. at the thermostat element 45 may give a valve movement of ¼ inch, so that if the element is to maintain a given temperature within ±5° F., the longitudinal movement of the valve will be of the order of ±(5/300) (¼) inch, or ±0.004 inch. This means that there will be an extreme movement during normal operation of less than 0.01 inch. If the temperature is to be maintained at say ±1° F., the maximum valve travel after the heater reaches its set temperature will be only a little over one thousandth of an inch. An important feature of my invention relates to the use of multiple ports to increase the rate of port opening with respect to and incident to temperature change at the thermostat element 45.

In practice too it is often desirable to limit the range of adjustment of the setting dial of the thermostat at the hands of the usual operator, for example to permit a skilled operator to set the thermostat to maintain at the thermostat element 45 any temperature within a predetermined range of temperatures, but to make it impossible for the normal operator to run the heater except at some temperature within this predetermined range, and particularly at no temperature above this predetermined range.

In the structure of Figure 2 there are two principal initial adjustments not made by the ordinary operator but quickly and easily made by a workman installing the device, and which together determine the range of setting adapted to be secured by angular shifting of the setting unit. These adjustments are of the dial 23 on the head 24, and of the sleeve 48 in the valve body.

The workman, after setting up as in Figure 1, partially unscrews the sleeve 48 at 34, turns the seat adjustment unit so that the seat carrier is all the way down (as shown in Figure 2), loosens the set screw 28 and angularly shifts the dial member until the indication corresponding to the desired maximum temperature, for example, 400° (see Figure 4a which shows a condition before the dial has been set), registers with a stationary reference mark 50 on the screw plug 29, then screws home the set screw, thereby completing the first of the preliminary adjustments. The burner is then allowed to heat up the contents of the vessel.

He now with a thermometer notes the maximum temperature when it is reached at the thermostat element 45, and immediately loosens the lock-nut 49 and screws the sleeve 48 inward until the valve is closed by engaging the raised seat, then tightens the lock-nut. This completes the preliminary adjustments, an unskilled operator now being able to set the dial to any desired temperature below the maximum without being able to set it for operation at temperatures higher than the maximum.

As indicated in Figures 4 and 4a, I may also limit the range of setting with respect to a low limit, for example, by mounting relatively angularly adjustable stops 51 and 52 upon the screw plug 29 and dial 23. The stop 51 may be on a collar 53, held in position by a set screw 54, about the outer end of the screw plug 29. The stop 51 may be adjusted (after loosening the set screw 54) until angular movement of the dial to settings corresponding to temperatures lower than the maximum is limited to any desired extent by the stop 52 coming against the stop 51 at dial readings corresponding to the desired low limit of permissible setting by an ordinary operator. In Figure 4a, the stop 52 is shown engaging the stop 51 in a dot-and-dash line illustration of the stop 52.

It will be understood that an angular shift of the dial moves the valve seat with a resultant corresponding shift in the temperature needed at the thermostat to close the valve, that is, of the thermostatically maintained temperature of the heater controlled by the thermostat.

Figure 4a shows actual temperatures marked on the setting dial. Sometimes it may be preferred not to have actual temperatures marked on the setting dial, since the setting dial is for use by an ordinary and perhaps temporary unskilled operator. In this event the initial adjustment of the sleeve 48 is preferably made with the heater at its desired maximum temperature (as indicated by a suitable thermometer) and with the seat carrier correspondingly retracted to its extreme low position.

Since, during normal operation, the range of movement of the valve is very small, as usually less than 0.01 inch if the temperature at the thermostatic element 45 is to be maintained within ±5° F. of a given setting, I provide multiple ports to make the rate of port opening from closed position effectively very large, being thereby able to use a smaller valve or/and to secure closer temperature regulation than would otherwise be possible.

I may provide any number of multiple ports 18 through the lower face 19 of the valve, each in the closed position of the valve covered by a seat portion 20 of a seat 21, which seat 21 is suitably ported at 55 to admit gas or other fuel peripherally into (or receive it from) the different ports of the valve as soon as the valve begins to lift from its seat.

In general, when the opening of the valve is very small, for example, a longitudinal distance of less than 0.01 inch, the total effective area may be considered as substantially this small distance multiplied by the sum of the peripheries of the different ports.

In the valve and seat of Figures 5 and 6, the valve has but two ports, 56 and 57, but with an effective port area for small openings of the valve substantially double the value it would have if the whole valve interior were but a single port receiving or discharging at its circumference, since the circumferences at 58 and 59 are together substantially equal to the circumference at 60. The port 56 is closed by the seat portion 61 and the port 57 is closed by the seat portion 62, while the port 63 in the seat is closed by the seat 64 in the valve. The seat 64 is supported by spiders 65 and the seat 61 is supported by spiders 66. The spiders in other figures are given the same reference numbers.

In the structure of Figures 7 and 8 the effective port area into the three ports 67, 68 and 69 for small extents of valve openings, as with the valve 0.01 inch from the seat, is this small distance times the sum of the five circumferences at 70, 71, 72, 73 and 74 respectively, or, with the proportions shown, about three times the effective area it would have if the admission were inward or outward along merely the single circumference 74.

In Figures 7 and 8 I make the seat surfaces at 75, 76 and 77 slightly larger than the ports 67, 68 and 69 respectively of the valve but illustrate in Figure 9 that the corresponding ports 78 in the valve and seat surfaces 79 in the seat and also the ports 80 in the seat and seat surfaces 81 in the valve may be dimensionally equal.

In Figure 9 the hollow interior of the valve barrel 17' presents any desired number $n$ of concentric ports 78 between concentric rings 81', the ports 78 of the valve registering with ring seats 79 of the seat 21' which seat presents its intermediate ports 80 to the rings 81' of the valve member.

Assuming the rings and ports to be of all the same radial thickness, if the valve beginning with the barrel is at the valve face made up of $n$ concentric rings radially spaced by the thickness of any ring, then a longitudinal movement of the valve of half this thickness will effect substantial full opening of all the ports.

Thus if the barrel were made up of twelve concentric rings 81' each of a thickness of 0.02 inch, a range of valve movement of but 0.01 inch will be required to vary the effective port area from zero to half the interior area of the whole barrel and with an effective port area for very small opening movements of the valve twelve times the value it would have with a barrel interior of but a single port.

It will be understood that some of the cooperative features of my invention are to some extent advantageous separately. For example, the seat member 20' of Figure 9 is for best cooperation with the valve mounted on a thermostatic setting unit, for example, as in Figure 2, but it may be optionally stationary and non-adjustable. In the same way some of the advantages of the invention may be secured without providing the valve with multiple ports.

In Figures 5 and 7 the outer ports 57 and 69 respectively are annularly tapering at the outer surfaces 82, to give easy flow and minimum fluid friction. The same can be done in any of the valves, but this feature is not necessary and has been omitted in Figure 9.

In the case of gas valves, it is desirable to have a small enough gas flow to maintain the pilot even when the thermostatic valve is closed. Such an adjustable pilot valve is shown at 83 controlling a port 84 and pressed by a spring 85 acting against a screw cap 86.

One of the difficulties met in some multiport valves in other arts for example German Patent No. 119,417, is that the considerable overlap at the seats causes high fluid friction with small distances of opening, such as a few thousandths of an inch. In Figure 9 there are no overlaps, and each seat is effectively a knife edge seat. In Figures 5 and 7, the outer surfaces 82 are tapered to form an outer knife edge seating surface of low fluid friction, and the other seating surfaces may be made as near knife edge surfaces as desired, by cutting down the extent of seating contact when the valve is closed.

In view of my invention and disclosure variations and modifications to meet individual whim or particular need will doubtless become evident to others skilled in the art to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a thermostatic device, a seat for a thermostatic valve, a carrier mounting the seat, a plug surrounding and longitudinally guiding the carrier, and a setting unit for shifting the position of the carrier and comprising a stem having bearing support in the plug, a head on the stem normally rigidly connected thereto, a dial normally in rigid connection with the head and stem and having angular adjustable connection between the dial and stem and a threaded connection between the stem and carrier and the carrier having an angularly interlocking support to prevent its angular movement during angular movement of the setting unit to effect an adjustment of the seat.

2. A seat for a thermostatic valve, means for adjusting the seat, a setting dial determining the adjustment of the seat and in which the valve seat is adapted to be longitudinally adjusted by a setting unit mounting the dial and means for adjustably limiting the movement of the setting unit in order to limit the setting range of the thermostat open to use by a normal operator.

3. In a thermostat valve, a valve body having chambers and a partition separating the chambers, the partition being provided with an opening, a hollow piston valve extending through the opening, making a fluid-tight joint with the walls of the opening, having a substantially flat valve face equipped with valve ports on one side of the partition, and having lateral ports on the other side of the partition, a valve seat cooperating with the valve on the one side of the partition, and thermostat means for operating the valve, which means produces small valve movement in maintaining a particular temperature.

4. In a thermostat valve, a valve body having chambers and a partition, provided with an opening, separating the chambers, a hollow piston valve passing through the opening and making a fluid-tight joint with the walls of the opening, there being a substantially flat valve face having multiple ports on one side of the partition and a lateral port into the valve interior on the other side of the partion, a ported valve seat cooperating with the substantially flat valve face to close off fluid flow through the valve when the valve is closed, and thermostat means for operating the valve, which means produces minute valve movement in maintaining a particular temperature.

5. In a thermostat valve, a valve body having chambers and a partition, provided with an opening, separating the chambers, a hollow piston valve passing through the opening and making a fluid-tight joint with the walls of the opening, there being a substantially flat valve face having multiple ports on one side of the partition and a lateral port into the valve interior on the other side of the partition, means for adjusting the position of the valve for any thermostat position, a ported valve seat cooperating with the substantially flat valve face to close off fluid flow through the valve when the valve is closed, means operable from outside the valve body for axially adjusting the position of the seat with respect to the valve, and thermostat means for operating the valve, which means produces minute valve movement in maintaining a particular temperature.

6. In a thermostat valve, a valve body having chambers and a partition, provided with an opening, separating the chambers, a hollow piston valve passing through the opening and making a fluid-tight joint with the walls of the opening, there being a substantially flat valve face having multiple ports on one side of the partition and a lateral port into the valve interior on the other side of the partition, a ported valve seat cooperating with the substantially flat valve face to close off fluid flow through the valve when the valve is closed, means accessible to the normal operator of the valve for adjusting the axial position of the seat with respect to the valve and means inaccessible to the normal operator of the valve for adjusting the axial position of the valve with respect to the seat, whereby the range of adjustment permitted to the normal operator can be limited, and thermostat means for operating the valve, which means produces minute valve movement in maintaining a particular temperature.

7. In a thermostat valve, a valve body having chambers and a partition, provided with an opening, separating the chambers, a hollow piston valve passing through the opening and making a fluid-tight joint with the walls of the opening, there being a substantially flat valve face having multiple ports on one side of the partition and a lateral port into the valve interior on the other side of the partition, a ported valve seat cooperating with the substantially flat valve face to close off fluid flow through the valve when the valve is closed, means for adjusting the axial position of the valve for any thermostat position, threaded means for adjusting the axial position of the seat, means for limiting the extent of turning of the threaded means for adjusting the seat, and thermostat means for operating the valve, which means produces minute valve movement in maintaining a particular temperature.

8. In a thermostatic device, a valve body, a valve in within the body operated by a thermostat, a valve seat cooperating with the valve, an adjustable connection between the valve and thermostat for permanently adjusting the position of the valve with respect to its seat to close the valve for any thermostat position and means readily operable from outside the valve for changing the valve seat position to make temporary adjustments in temperature setting.

FREDERICK R. MOTT.